United States Patent
Tang et al.

(10) Patent No.: US 11,335,279 B2
(45) Date of Patent: May 17, 2022

(54) DISPLAY OPTIMIZATION METHOD AND A DISPLAY APPARATUS

(71) Applicants: BEIJING BOE OPTOELECTRONICS TECHNOLOGY CO., LTD., Beijing (CN); BOE Technology Group Co., Ltd., Beijing (CN)

(72) Inventors: Zhen Tang, Beijing (CN); Lin Lin, Beijing (CN); Jian Sun, Beijing (CN); Ziqiang Guo, Beijing (CN); Yu Lei, Beijing (CN); Yadong Ding, Beijing (CN); Bingxin Liu, Beijing (CN); Hao Zhang, Beijing (CN); Lili Chen, Beijing (CN); Ruifeng Qin, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 333 days.

(21) Appl. No.: 16/492,516

(22) PCT Filed: Sep. 4, 2018

(86) PCT No.: PCT/CN2018/103989
§ 371 (c)(1),
(2) Date: Sep. 9, 2019

(87) PCT Pub. No.: WO2020/047748
PCT Pub. Date: Mar. 12, 2020

(65) Prior Publication Data
US 2021/0366416 A1    Nov. 25, 2021

(51) Int. Cl.
*G09G 3/34* (2006.01)
*G06F 3/01* (2006.01)
(Continued)

(52) U.S. Cl.
CPC .......... *G09G 3/3426* (2013.01); *G06F 3/013* (2013.01); *G06V 20/00* (2022.01); *G09G 3/32* (2013.01);
(Continued)

(58) Field of Classification Search
CPC .......... G09G 3/3426; G09G 3/32; G09G 3/36; G09G 2320/0613; G09G 2320/0646;
(Continued)

(56) References Cited

U.S. PATENT DOCUMENTS 9,836,119 B2 * 12/2017 Plowman .............. G06F 1/3265
2012/0288139 A1 * 11/2012 Singhar ................. G06F 1/3265
382/103

(Continued)

FOREIGN PATENT DOCUMENTS

CN        103999145 A    8/2014
CN        104169838 A   11/2014
(Continued)

OTHER PUBLICATIONS

International Search Report & Written Opinion dated Jun. 3, 2019, regarding PCT/CN2018/103989.

*Primary Examiner* — Brent D Castiaux
(74) *Attorney, Agent, or Firm* — Intellectual Valley Law, P.C.

(57) ABSTRACT

The present application discloses a display optimization method. The method includes setting a light-emitting substrate including a first plurality of unit regions. Each unit region is associated with a luminance produced by one or more light-emitting diodes. The method further includes
(Continued)

determining a sensitive area having a second plurality of unit regions in part of the light-emitting substrate in association with eyeball position of viewer relative to the light-emitting substrate and a non-sensitive area having a plurality of combined-regions in remaining part of the light-emitting substrate. Additionally, the method includes transferring local variables including information about the sensitive area and the combining factor k to a processor. Furthermore, the method includes operating the processor based on the local variables to individually control a first luminance of the one unit region in the sensitive area and to commonly control a second luminance of one combined-region in the non-sensitive area.

16 Claims, 3 Drawing Sheets

(51) Int. Cl.
    *G09G 3/32*     (2016.01)
    *G09G 3/36*     (2006.01)
    *G06V 20/00*     (2022.01)

(52) U.S. Cl.
    CPC ....... *G09G 3/36* (2013.01); *G09G 2320/0613* (2013.01); *G09G 2320/0646* (2013.01); *G09G 2320/0686* (2013.01); *G09G 2320/103* (2013.01); *G09G 2330/08* (2013.01); *G09G 2330/12* (2013.01); *G09G 2340/00* (2013.01); *G09G 2354/00* (2013.01); *G09G 2370/02* (2013.01)

(58) Field of Classification Search
    CPC ..... G09G 2320/0686; G09G 2320/103; G09G 2330/08; G09G 2330/12; G09G 2340/00; G09G 2354/00; G09G 2370/02; G09G 2320/0653; G09G 2360/16; G06F 3/013; G06F 3/14; G06K 9/00624; G06V 20/00
    See application file for complete search history.

(56) References Cited

U.S. PATENT DOCUMENTS

| | | |
|---|---|---|
| 2014/0204016 A1 | 7/2014 | Plowman |
| 2014/0313120 A1* | 10/2014 | Kamhi ............... G06K 9/00604 345/156 |
| 2014/0362446 A1* | 12/2014 | Bickerstaff .......... G02B 27/017 359/630 |
| 2015/0009473 A1* | 1/2015 | Su .......................... A61B 3/145 351/206 |
| 2017/0116957 A1 | 4/2017 | Chen et al. |
| 2017/0116958 A1* | 4/2017 | Chen .................... G06F 1/3265 |
| 2017/0308161 A1 | 10/2017 | Richards et al. |
| 2018/0059420 A1 | 3/2018 | Woo et al. |

FOREIGN PATENT DOCUMENTS

| | | |
|---|---|---|
| CN | 107248403 A | 10/2017 |
| CN | 107797280 A | 3/2018 |
| JP | 2016130804 A | 7/2016 |
| WO | 2018110056 A1 | 6/2018 |

* cited by examiner

DISPLAY OPTIMIZATION METHOD AND A DISPLAY APPARATUS

CROSS-REFERENCE TO RELATED APPLICATION

This application is a national stage application under 35 U.S.C. § 371 of International Application No. PCT/CN2018/103989, filed Sep. 4, 2018, the contents of which are incorporated by reference in the entirety.

TECHNICAL FIELD

The present invention relates to display technology, more particularly, to a display optimization method, and a display apparatus implementing the method.

BACKGROUND

Ultra-high-definition display apparatus based on liquid crystal display (LCD) or light-emitting display (LED) has many applications including virtual reality (VR) video image display. VR display apparatus has strong demands of display image qualities with high resolution, high refreshing rate, and high stability to allow viewer to have a better sense of immersion. An unproved image display optimization method and apparatus are always desired.

SUMMARY

In an aspect, the present disclosure provides a method for display optimization of a display apparatus. The method includes setting a light-emitting substrate including a first plurality of unit regions. Each unit region is associated with a luminance produced by one or more light-emitting diodes. The method further includes determining a sensitive area having a second plurality of unit regions in part of the light-emitting substrate in association with eyeball position of viewer relative to the light-emitting substrate and a non-sensitive area having a plurality of combined-regions in remaining part of the light-emitting substrate. Each combined-region contains k unit regions, where k is a combining factor greater than 1. Additionally, the method includes transferring local variables including information about the sensitive area and the combining factor k to a processor. Furthermore, the method includes operating the processor based on the local variables to drive the one or more light-emitting diodes associated with one unit region to individually control a first luminance of the one unit region in the sensitive area and to drive k times of the one or more light-emitting diodes in one combined-region to commonly control a second luminance of k unit regions of the one combined-region in the non-sensitive area.

Optionally, the step of setting the light-emitting substrate includes arranging the first plurality of unit regions into m×n unit regions and determining a number of the one or more light-emitting diodes based on a dimension of the light-emitting substrate and a display resolution, wherein m is a row number >1 and n is a column number >1.

Optionally, the method further includes initializing memories of the processor regarding the local variables including size of the sensitive area, coordinates of eyeball position of a viewer projected on the light-emitting substrate for selecting the second plurality of unit regions of the sensitive area among the first plurality of unit regions in the light-emitting substrate, and the combining factor k. Furthermore, the method includes initializing values stored in a register associated with a driver configured to drive the one or more light-emitting diodes associated with each unit region.

Optionally, the method further includes preforming a handshake operation to establish data communication through internet between the processor and devices collecting the local variables.

Optionally the method additionally includes keeping the processor idle if the handshake operation fails. Moreover, the method includes refreshing memories of the processor with the local variables received via internet from the devices collecting the local variables if the handshake operation succeeds.

Optionally the step of operating the processor includes analyzing image data to be displayed. Additionally, the step of operating the processor includes determining a first driving current based on the image data. Furthermore, the step of operating the processor includes recording the first driving current in a register associated with a driver. Moreover, the step of operating the processor includes outputting the first driving current to drive the one or more light-emitting diodes associated with a unit region in the sensitive area to produce the first luminance for a current frame of image.

Optionally, the step of determining the first driving current includes manipulating the image data to adjust the first driving current higher for enhancing a value of the first luminance for a unit region corresponding to a high brightness value of the image or reducing another value of the first luminance for another unit region corresponding to a low brightness value of the image.

Optionally, the step of manipulating the image data includes performing high-performance rendering or anti-distortion processing to part of the image data associated with the sensitive area.

Optionally, the step of operating the processor further includes determining a second driving current based on the image data respectively for k unit regions in a combined-region. The step of operating the processor further includes recording the second driving current in each of k registers respectively associated with k drivers. Additionally, the step of operating the processor includes adjusting the second driving current outputted to commonly drive all light-emitting diodes associated with the combined-region to produce the second luminance for the current frame of image.

Optionally, the step of operating the processor further includes performing a scene recognition operation on the current frame of image. Additionally, the step of operating the processor includes refreshing the first driving current with a same value recorded in corresponding one register associated with the unit region in the sensitive area and refreshing the second driving current with an alternate same value recorded in k registers associated with the combined-region in the non-sensitive area if the scene recognition operation determines no scene change. Furthermore, the step of operating the processor includes updating the first driving current and the second diving current in respective registers if the scene recognition operation determines a scene change.

Optionally, the step of operating the processor further includes outputting the first driving current and the second driving current refreshed or updated in the respective registers to drive corresponding light-emitting diodes for producing an updated first luminance and an updated second luminance for a next frame of image.

Optionally, the step of operating the processor further includes determining whether an interruption signal is received by the processor, if true, the step of operating the processor includes enabling a built-in-self-test mode for the display apparatus for detecting whether any malfunction of the display apparatus exists. If the interruption signal is not received by the processor, the step of operating the processor includes performing a scene recognition operation on the current frame of image.

Optionally, the method further includes initializing memories of the processor if any malfunction of the display apparatus is detected and refreshing the memories of the processor with the local variables if no malfunction of the display apparatus is detected.

In another aspect, the present disclosure provides a display apparatus comprising a driving IC and at least one display panel. The driving IC includes a processor and a plurality of LED drivers. Each LED driver is configured to drive one or more light-emitting diodes for controlling a first luminance of a minimum region in the at least one display panel or a second luminance of 1/k of a combined-region comprising k minimum regions. The processor is configured to determine a sensitive area in part of the display panel containing multiple minimum regions and a non-sensitive area in remaining part of the display panel containing multiple combined-regions and to individually adjust the first luminance per minimum region and commonly adjust the second luminance of k minimum regions per combined-region.

Optionally, the processor includes an integrated circuit configured as an application processor, a microprocessor in a personal computer, a field-programmable gate array (FPGA) processor, and an Advanced RISC Machine (ARM) processor.

Optionally, the at least one display panel includes a liquid crystal display panel including a light-emitting substrate having a plurality of unit regions. Each unit region is illuminated by the one or more light-emitting diodes as a backlight source for producing a luminance of the minimum region in the display panel.

Optionally, the at least one display panel includes a light-emitting diode display panel including a plurality of pixels. Each pixel contains the one or more light-emitting diodes for producing a luminance of the minimum region in the display panel.

Optionally, the display apparatus further includes at least one camera to trace an eyeball position of a viewer relative to the at least one display panel and transfer information about the eyeball position via internet protocol to the processor to determine local variables including a size of the sensitive area and coordinates of eyeball position of a viewer projected on the at least one display panel for selecting the multiple minimum regions of the sensitive area and identifying the multiple combined-regions of the non-sensitive area.

Optionally, the processor is further configured to analyze image data to be used for displaying a frame of image, performing scene recognition, deducing luminance values of the sensitive area and non-sensitive area corresponding to a current scene, refreshing or updating a current signal stored in a register of each of the plurality of the LED drivers to control the first luminance of a minimum region in the sensitive area and the second luminance of a combined-region in the non-sensitive area, performing high-performance rendering or anti-distortion processing to only part of the image data associated with the sensitive area and performing luminance reduction to remaining part of the image data associated with the non-sensitive area, and switching into a build-in-self-test mode or an initialization mode.

In yet another aspect, the present disclosure provides a head-mounted device including a display apparatus described herein and configured for augmented reality or virtual reality application.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

One conventional method is to use a specific are shaped lens to display image on a screen covering entire human visual range, but it leads to unavoidable image distortion especially in four corners of the screen. Typical anti-distortion treatment requires performing image processing to handing huge amount of data based on anti-distortion algorithm in an application processor (AP), taking up lots of CPU/GPU resources, increasing power consumption, and affecting the performance of AP for handling other tasks. Due to limitation of AP, the anti-distortion image processing may not be fully completed in time for one frame of image, leading to impaired image quality with screen tearing effect. Other issues such as deviation in relative locations between human eyes and screen may lead to inaccurate calculation in those anti-distortion image treatments and directly to cause uncomfortable viewing experiences to users.

Figure 1:
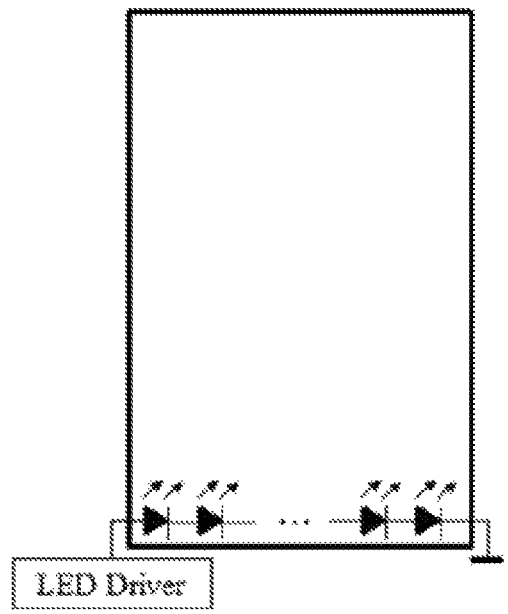
FIG. 1 is a schematic diagram of a conventional backlight plate illuminated by multiple light-emitting diodes controlled by a LED driver IC.

For VR display apparatus, the display panel can be any kind of advanced types based on liquid crystal display (LCD) technology or light-emitting diode display (LED) technology or others. Using an example of a LCD display panel, a backlight plate is required as a flat panel light source for illuminating all pixels in a liquid crystal layer over the backlight plate. In a specific implementation, the backlight plate can be made by a passive lamination material illuminated by multiple LEDs embedded therein. FIG. 1 is a schematic diagram of a conventional backlight plate illuminated by multiple light-emitting diodes controlled by a LED driver IC. Referring to FIG. 1, optionally, a row of LEDs is disposed at one side edge of the backlight plate. Light emission of the row of LEDs is driven by a single LED driver IC and is guided by a light guiding plate attached with the backlight plate to illuminate the whole backlight plate uniformly. However, when using this backlight plate for supporting image display of the LCD panel of the VR display apparatus, the whole frame of image needs to be processed in rendering or anti-distortion treatment, which requires large amount calculations from the application processor yet insufficient for satisfactory VR imaging application.

Accordingly, the present disclosure provides, inter alia, a display optimization method for reducing amount of calculation and system power consumption and compensating image distortion due to structural errors, a display panel and a display apparatus that substantially obviate one or more of the problems due to limitations and disadvantages of the related art. For a display panel based on a backlight plate without major change in hardware setting, the display optimization method is to refresh local variables and driving currents stored in registers in divided respective areas of the backlight plate to separately adjust luminance in those areas. Optionally, the backlight plate is merely a substrate that is either indirectly illuminated by some active light elements disposed behind to serve a light source for LCD type display or directly contains some light-emitting elements as a light-emitting substrate for image display. Optionally, the respective area includes a human eye sensitive area being selected and corrected in real time based on viewer gaze information tracking. Optionally, the driving current is dynamically adjusted and saved in the respective register to achieve display optimization based on different scenes. The display optimization method can be executed without secondary program compilation and downloading.

Figure 2:
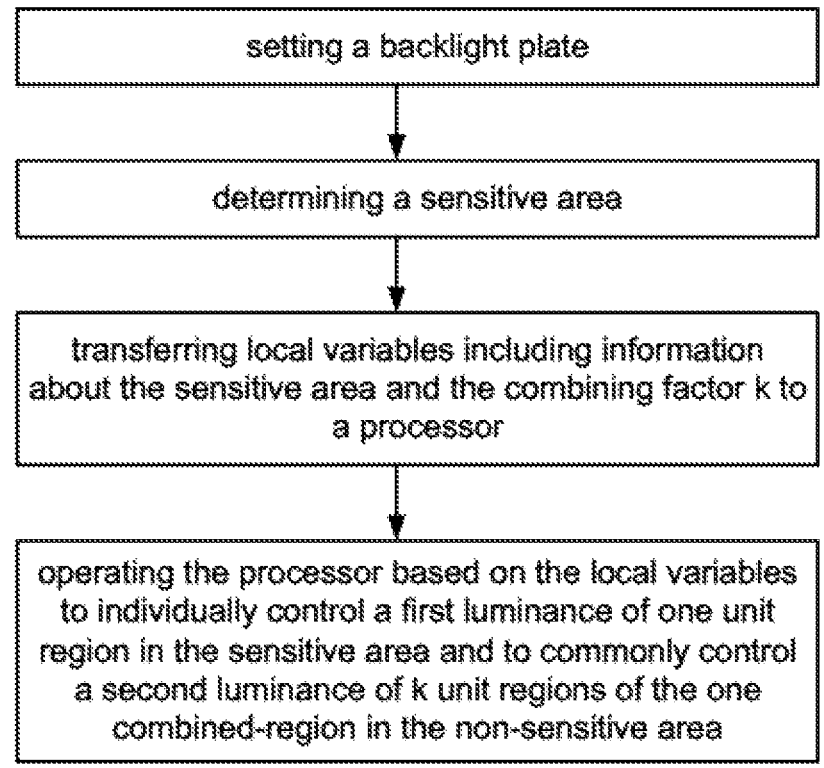
FIG. 2 is a flow chart illustrating a display optimization method according to some embodiments of the present disclosure.

In one aspect, the present disclosure provides a display optimization method. FIG. 2 is a flow chart illustrating a method for display optimization of a display apparatus according to some embodiments of the present disclosure. Optionally, the method is implemented using a display apparatus having a backlight plate in a LCD display panel as an example. In another embodiment, the method can also be implemented in a light-emitting substrate associated with a LED or OLED based display apparatus that is applicable for various applications not just limited to virtual reality (VR) or augmented reality (AR) image display application.

Referring to FIG. 2, the method includes setting a backlight plate for the LCD display panel. Setting the backlight plate or light-emitting substrate includes dividing it to a first plurality of unit regions. Each unit region is associated with a minimum controllable region in the backlight plate where one or more light-emitting diodes (LEDs) are driven by a single LED driver IC to produce a luminance therein. Optionally, the unit region has a finite dimension wherein the one or more LEDs occupying only partial area of it. The LED driver IC includes a register to store a driving current generated by an integrated driving circuit and output the driving current to drive light emission of the one or more LEDs. The light emission from the one or more LEDs in the unit region is guided by a light guide element to produce a uniform luminance within the unit region. The luminance is substantially controlled by the driving current which is manipulated or adjusted by an application processor (AP) based on location of the unit region in the backlight plate or light-emitting substrate. Optionally, each unit region is correspondingly for illuminating one or more pixels in the LCD display panel and all unit regions of the whole backlight plate or light-emitting substrate are responsible to illuminating all pixels for displaying a full frame of image.

In some embodiments, the AP is one option of a front processor associated with an integrated circuit (IC) for driving the display panel. Other processors such as a microprocessor in personal computer (PC), a processor in field-programmable gate array (FPGA), and a processor in an Advanced RISC Machine (ARM) can be implemented in the display optimization method. In the AP, optionally, it shares control signals for performing handshake operation for establishing network communication or inducing an interruption for system malfunction check, saving interrupt and general input/output resources of the processor while being compatible with different processing capabilities.

Figure 3:
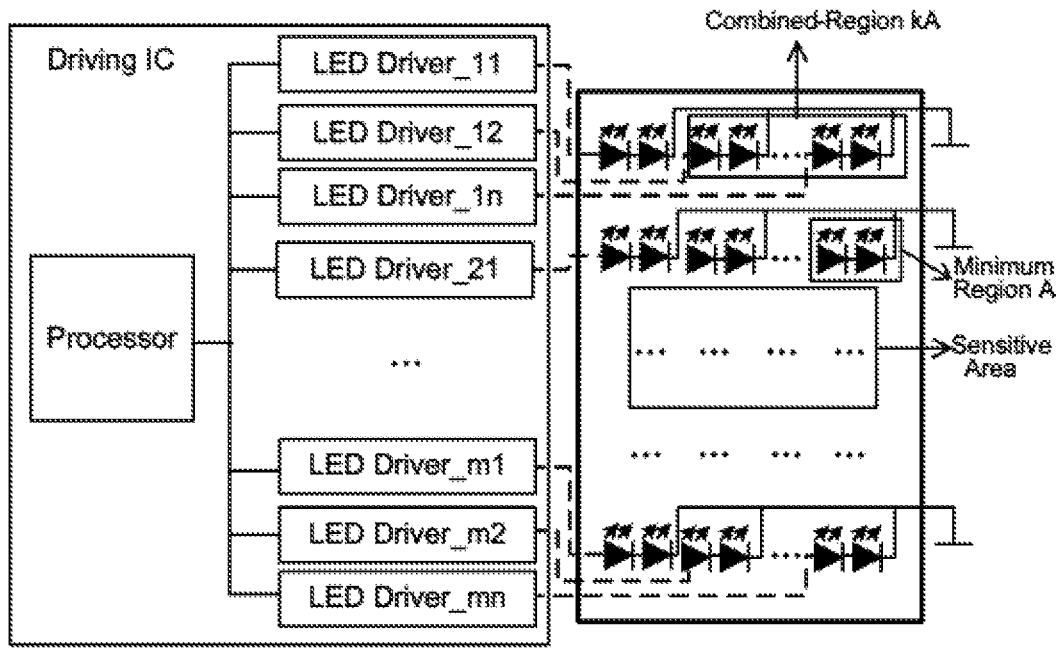
FIG. 3 is schematic diagram of a display apparatus including a light-emitting substrate illuminated by multiple light-emitting diodes driven by multiple LED diver ICs according to some embodiments of the present disclosure.

In an specific embodiment, the step of setting a backlight plate or light-emitting substrate includes arranging the first plurality of unit regions into m×n unit regions, i.e., m rows and n columns of unit regions. Here m is a row number >1 and n is a column number >1. Each unit region contains a number of LEDs which is determined based on a dimension of the backlight plate or light-emitting substrate and a display resolution of the associated display panel. For example, for a 5.7 inch Ultra-High-Definition (UHD) VR displayer, a LED-based backlight plate is divided into m×n=64×10=640 unit regions. Each unit region is a minimum unit having an independent luminance from light emission of the number of LEDs controlled by a separate LED driver IC. FIG. 3 is schematic diagram of a display apparatus including a substrate served as backlight plate illuminated by multiple light-emitting diodes driven by multiple LED driver ICs according to some embodiments of the present disclosure. Optionally, the substrate is a light-emitting substrate of a LED-based display panel. Referring to FIG. 3, in general, the substrate includes a first plurality of unit regions in an m×n array containing one or more LEDs driven by a LED diver IC, or simply a LED driver, in each unit region. For example, a LED driver_11 drives a number LEDs in a unit region in a first row and a first column of the array. A LED driver_1n drives a number of LEDs in another unit region in a first row and an n-th column of the array. All these LED drivers are controlled by the AP, or generally, a processor selected from an application processor (AP), a microprocessor in personal computer (PC), a field-programmable gate array (FPGA) processor, and an Advanced RISC Machine (ARM) processor, or others.

Referring to FIG. 2, the method for display optimization further includes a step of determining a sensitive area having a second plurality of unit regions in part of the light-emitting substrate in association with eyeball position of viewer relative to the light-emitting substrate and a non-sensitive area having a plurality of combined-regions in remaining part of the light-emitting substrate. This step is indented to perform more intensive image processing based on relatively small partial area of the light-emitting substrate that is determined to be sensitive to human eyes while perform simplified image processing based on rest partial area of the light-emitting substrate. The sensitive area includes the second plurality of unit regions being a partial group of the first plurality of unit regions. The non-sensitive area includes remaining portion of unit regions which are re-organized into a plurality of combined-regions. Each combined-region contains k unit regions and k is a combining factor greater than 1. Each combined-region can be treated as a signal region that is controlled to produce a common luminance for all k number of unit regions therein. Optionally, k can be flexibly selected depending on different applications or may be depended on different scenes of display images. By combining k unit regions as one combined-region in the non-sensitive area, the image processing for the non-sensitive area can be simplified to save power and reduce load to the AP in image processing.

In an embodiment, the sensitive area including a size and relative location in the light-emitting substrate is determined based on determining locations of human (viewer) eyeballs relative to the display panel (or screen). In case of VR display application, the display apparatus usually is provided in a format of head-mounted device. The relative locations of the viewer's eyeballs can be firstly measured using a pair of camera (or other detection devices) installed in the VR display apparatus and secondly calculated using an eyeball tracking algorithm.

Figure 4:
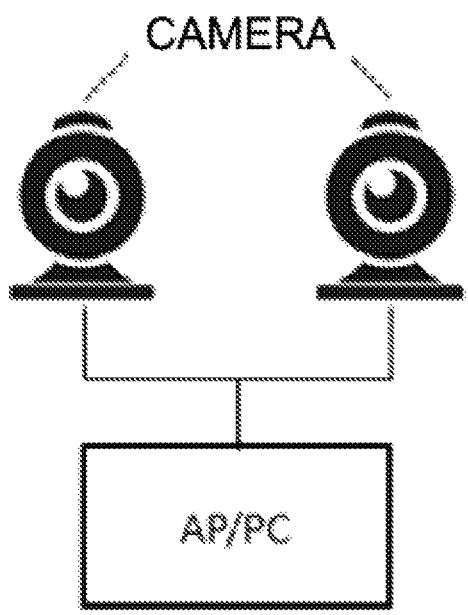
FIG. 4 is a simplified diagram of a detection device communicated with the display apparatus of FIG. 3 for collecting viewer eyeball relative location information according to an embodiment of the present disclosure.

FIG. 4 is a simplified diagram of a detection device communicated with the display apparatus of FIG. 3 for collecting viewer eyeball relative location information according to an embodiment of the present disclosure. For example, a camera is used to collect gaze information such as gaze direction and gaze position. Optionally, the gaze information may vary dynamically within a certain range depending on viewing angle on certain scene of a particular frame of image and due to viewer's personal preference or manufacture errors. The eyeball relative location information obtained by the detection device can be sent to the application processor (AP) AP is defining in real time that a size Δ of a current sensitive area based on the gaze information and a distance from the viewer eyeballs to the display panel (which is directly associated with the light-emitting substrate). Additionally, the relative locations of the viewer eyeballs are projected to the light-emitting substrate in terms of a coordinate: Δx, Δy. This information can be recorded as local variables, Sx, Sy, and timely refreshed in a memory associated with the AP.

In an embodiment, the step of determining the sensitive area and accordingly the non-sensitive area in the backlight plate includes initializing memories of the AP regarding the local variables including size Δ of the sensitive area, coordinates of eyeball position of a viewer projected on the light-emitting substrate for selecting the second plurality of unit regions of the sensitive area among the first plurality of unit regions in the light-emitting substrate, and the combining factor k. In the fovea region of the human eye, high-density cones are distributed and have the best visual acuity. From the center outwards to a certain angle, as the density of cones decreases, the ability to distinguish and perceive decreases accordingly. Therefore, in the process of screen display, only the center-concave field of view is a visual sensitive area that needs high-definition image display, and the surrounding area of the field of view can be rendered in a blurred manner without being noticed by human eye. In an implementation, a typical angle of the center-concave field of view is about 30°. Given a determination of the eyeball position relative to the light-emitting substrate based on a real time gaze information, the size Δ of the sensitive area and a real time location (i.e., eyeball position coordinate: Δx, Δy) in the backlight plate can be calculated by the AP based on the 30° angle of the center-concave field of view. The size Δ of the sensitive area leads to a determination of which unit region in the backlight plate belongs to the sensitive area. The surrounding area beyond the sensitive area in the backlight plate is determined to be the non-sensitive area in which the every k unit regions are combined to form a combined-region. Optionally, the combining factor k is flexibly depended on applications. Further, the step includes initializing values stored in a register associated with a LED driver configured to drive the one or more light-emitting diodes associated with each unit region.

Referring to FIG. 2, the method further includes transferring local variables including information about the sensitive area and the combining factor k to the AP. Initially, the AP is in idle state After initialization, the AP is ready to accept real time variables including currently determined the size Δ of the sensitive area, viewer's eyeball position coordinates Δx, Δy, and the combining factor k.

In the embodiment, the method further includes performing a handshake operation after initialization to establish data communication through internet between the AP and detection devices collecting the local variables. Optionally, the data communication can be performed using a wireless local area network Optionally, a wireless communication interface protocol such as Bluetooth may be used. Once the handshake operation is successful, the local variables can be transferred vi a data input process through internet protocol (IP) to the AP substantially in real time. Optionally, the location variable transferred via the IP data input process is focused on information related to the sensitive area only while independent from the algorithm for determining the sensitive area based on collected gaze information. Optionally, the transfer of location variables into memory of the AP avoids conflicts with main program parameters, leading to a stable performance and good portability of the method implemented different display apparatus. Oppositely, if the handshake operation fails, the internet protocol is not initiated. The AP then will be still in idle state.

Referring to FIG. 2 again, the method further includes a step of operating the AP based on the local variables to drive the one or more light-emitting diodes associated with one unit region to individually control a first luminance of the one unit region in the sensitive area and to drive k times of the one or more light-emitting diodes in one combined-region to commonly control a second luminance of k unit regions of the one combined-region in the non-sensitive area. In an example, there is only one light-emitting diode disposed in each unit region producing only the first luminance that is controlled by the AP. In each combined-region including k unit regions, there are k light-emitting diodes respectively disposed in the k unit regions. The k light-emitting diodes are controlled by the AP to emit light at a same time to produce the second luminance. Ater successful handshake, the AP receives the local variables at the tune and can use the local variable to divide the light-emitting substrate to obtain the sensitive area and correspondingly the non-sensitive area at the current time. The AP can analyze image data to be displayed in the sensitive area; determine a first driving current based on the image data for each unit region in the sensitive area; record the first driving current in a register associated with a LED driver designed to drive the LEDs in the corresponding unit region; and output the first driving current (after proper data manipulation or image rendering) to drive the LEDs associated with a unit region in the sensitive area to produce the first luminance of the unit region. Optionally, the image data being analyzed by the AP to determine the first driving current for each unit region in the sensitive area does not depended on how the sensitive area is determined.

Optionally, the step of operating the AP is to perform manipulation of the image data to adjust the first driving current higher for enhancing a value of the first luminance for a unit region corresponding to a high brightness value of the image or reducing another value of the first luminance for another unit region corresponding to a low brightness value of the image. Optionally, the AP is operated to perform high-performance rendering or anti-distortion processing to part of the image data associated with the sensitive area. This is done individually for each and every unit regions in the sensitive area for displaying a current frame of image.

Additionally, the method includes a step of operating the AP for determining a second driving current based on the image data respectively for k unit regions in a combined-region, recording the second driving current in each of k registers respectively associated with k LED drivers, and adjusting the second driving current outputted to commonly drive all LEDs associated with the combined-region to produce the second luminance for the current frame of image.

Optionally, the AP is to use each combined-region having k unit regions as a single control unit to adjust the luminance commonly for the k unit regions. For example, as seen in FIG. 3, in a light-emitting substrate with m×n unit regions, k can be equal to or smaller than n. Optionally, one row of n unit regions in the non-sensitive area is combined to form one combined-region. Thus, the whole row in the non-sensitive area corresponds to a same luminance which is adjusted at the same time by the AP. Optionally, the luminance for the whole row is reduced to save lighting power. Of course, the combining factor k is determined or varied based on specific content of display image as well as overall display optimization of the display apparatus.

In a specific embodiment, the step of operating the AP includes performing a scene recognition operation based image data to be displayed as the current frame of image. Optionally, if the scene recognition operation determines no scene change, the AP is configured to refresh the first driving current with a same value recorded in corresponding one register associated with the unit region in the sensitive area and refresh the second driving current with an alternate same value recorded ink registers associated with the combined-region in the non-sensitive area. Optionally, if the scene recognition operation determines a scene change, the AP is configured to update the first driving current and the second driving current in respective registers respectively with new values associated with the new scene. Then, the data processing in respective sensitive area and non-sensitive area can be performed again based on the new values of the first driving current and the second driving current.

Optionally, the step of operating the AP also includes outputting the first driving current and the second driving current refreshed or updated in the respective registers to drive corresponding light-emitting diodes for producing an updated first luminance and an updated second luminance for a next frame of image.

Figure 5:
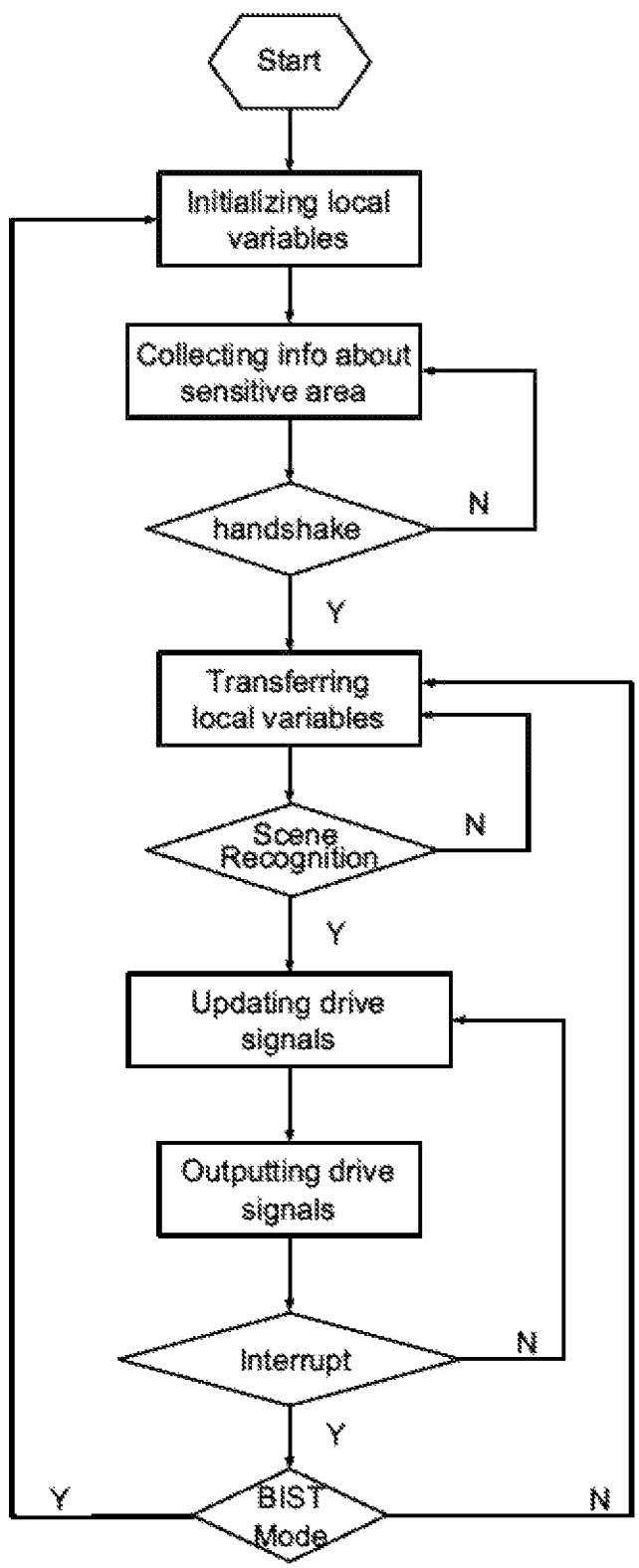
FIG. 5 is a flow chart of a method of operating the display apparatus of FIG. 3 combined with the detection device of FIG. 4 according to an embodiment of the present disclosure.

FIG. 5 is a flow chart of a method of operating the display apparatus of FIG. 3 combined with the detection device of FIG. 4 according to an embodiment of the present disclosure. As shown in FIG. 3 the display apparatus includes a driving IC and at least one display panel. The driving IC includes a processor and a plurality of LED drivers Each LED driver is configured to drive one or more light-emitting diodes for controlling a first luminance of a minimum region in the at least one display panel or a second luminance of 1/k of a combined-region comprised of k minimum regions. The processor is configured, based on local variables related to relative viewer eyeball position collected by a detection device of FIG. 4, to determine a sensitive area in part of the display panel containing multiple minimum regions and a non-sensitive area in remaining part of the display panel containing multiple combined-regions and to individually adjust the first luminance per minimum region and commonly adjust the second luminance of k minimum regions per combined-region. In an embodiment, the processor includes an integrated circuit configured as an application processor (AP), a microprocessor in a personal computer (PC), a field-programmable gate array (FPGA) processor, and an Advanced RISC Machine (ARM) processor. Here, AP is used as an example to illustrate the method.

In an embodiment, the method illustrated in FIG. 5 starts with an idle state set for the AP Optionally, the next step is to initiate memories of the AP to make it ready for multiple local variables including at least location coordinates to be determined for the sensitive area, combining factor k for the non-sensitive area, driving current stored in each register for a corresponding LED driver. After initialization, the AP is ready to receive any information regarding the division of the light-emitting substrate (or simply the display panel) into a sensitive area and a non-sensitive area. Optionally, this information is based on viewer gaze information collected by a detection device separated from the display panel yet optionally integrated together with the display apparatus. In the embodiment, the detection device can be a camera for tracing viewer gaze information dynamically and transfer this information via a communication link.

Referring to FIG. 5, the method includes a next step of performing a handshake operation between the AP and other devices to establish a network communication link between the AP and the detection device. If the handshake is not successful, the AP would stay in the idle state. If the handshake is successful, the AP is receiving the gaze information (e.g., gaze direction and gaze position) from the detection device based on which a sensitive area corresponding to a projection of the eyeball onto the display panel (e.g., along the gaze direction) can be determined. In particular, a size Δ of the sensitive area is provided and coordinates Δx, Δy, of relative eyeball position in the display panel can be determined and saved (for the first tone) or refreshed (later on) in memory. Accordingly, a non-sensitive area, which is merely renaming area of the display panel, is also determined. Determination of the sensitive area means that a first plurality of unit regions is identified. A combining factor k can also be set to define that each of multiple combined-regions in the non-sensitive area is combined by k unit regions.

In the embodiment, once the AP lays out the sensitive area in the display panel it can use the one or more LEDs in each unit region to individually control a first luminance per unit region for adjusting the image to be displayed by the display panel. In particular, the AP is configured to analyze the image data to be displayed and make adjustment (if necessary) in certain pixels by timing one or more first luminance per unit region. The AP is further configured to write a first driving current in a register $R_{BLi}$ associated with a LED driver. The first driving current, if outputted to the LED driver, is to drive the one or more LEDs in the corresponding unit region to emit light to achieve the first luminance desired for illuminating corresponding pixels for an optimized display. Optionally, the first luminance is adjusted for each unit region of a light-emitting substrate attached to a LCD display panel for supporting image display. Optionally, the first luminance is adjusted directly for one or more pixels of a LED display panel. Optionally, the first driving current is adjusted higher for enhancing a value of the first luminance for a unit region corresponding to a high brightness value of the image or reducing another value of the first luminance for another unit region corresponding to a low brightness value of the image, enhancing image display effect.

In the embodiment, the AP also employs a combined-region as a unit to commonly adjust a second luminance per one combined-region (or k unit regions). Effectively, a second driving current is written to a register $R_{NBLi}$ for the k LED drivers for the k unit regions within the combined-region. Optionally, the second driving current is adjusted to produce a lower second luminance for all k unit regions of the combined-region in the non-sensitive area. This can save power consumption of the light-emitting substrate without affecting image quality.

Referring to FIG. 5, the method of operating the AP includes performing scene recognition based on analysis result of a current frame of image data. During real life display, each frame of image data is subject of this scene recognition processing. Optionally, if the scene recognition operation determines no scene change, the AP is configured to refresh the first driving current with a same value recorded in corresponding one register $R_{BLi}$ associated with the unit region in the sensitive area and refresh the second driving current with an alternate same value recorded in k registers $R_{NBLi}$ associated with the combined-region in the non-sensitive area. Optionally, if the scene recognition operation determines a scene change, the AP is configured to update the first driving current and the second driving current in respective registers $R_{BLi}$ and $R_{NBLi}$ with respective new values so that the luminance in different regions of the light-emitting substrate can be re-adjusted for the new scene.

Referring to FIG. 5, the method includes outputting the first driving current and the second driving current refreshed or updated in the respective registers to drive corresponding LEDs in respective unit regions of the sensitive area for producing an updated first luminance and drive corresponding LEDs in respective combined-regions of the non-sensitive area for producing an updated second luminance for a next frame of image.

In another embodiment, referring to FIG. 5, the method of driving the display apparatus further includes determining whether an interruption signal (named as AP INT) is received by the AP. If an AP INT signal is received, a built-in-self-test (BIST) mode for the display apparatus is enabled for detecting whether any malfunction of the display apparatus such as backlight flicker, abnormal display, etc. exists. If there is any malfunction detected, the AP is returned to initialization state with all local variables being taken the initialized values. If no malfunction is detected, the AP INT signal is merely an indicator of variation of sensitive area during the dynamic process of the image display from one frame to another. If an AP INT is not received by the AP (or an A INT signal is ineffective), the AP is returned to its operation on performing scene recognition for the current frame of age.

Based on the method of the present disclosure, not only the display image can be optimized, certain viewing discomfort issue due to structural error such as variation of relative eyeball position can be eliminated. In the sensitive area, which is just a partial area of the light-emitting substrate of the display panel, high performance image data rendering and anti-distortion treatment can be executed with less AP calculation resources. In the non-sensitive area the image processing can be executed with simple brightness adjustment, substantially reducing calculation amount of the AP and power consumption of the display apparatus.

In another aspect the present disclosure provides a display apparatus. The display apparatus, as shown in FIG. 3, includes a driving IC and at least one display panel. The driving IC includes a processor and a plurality of LED drivers. Each LED driver is configured to drive one or more light-emitting diodes for controlling a first luminance of a minimum region in the at least one display panel or a second luminance of 1/k of a combined-region comprised of k minimum regions. The processor is configured, based on local variables related to relative viewer eyeball position collected by a detection device of FIG. 4, to determine a sensitive area in part of the display panel containing multiple minimum regions and a non-sensitive area in remaining part of the display panel containing multiple combined-regions and to individually adjust the first luminance per minimum region and commonly adjust the second luminance of k minimum regions per combined-region. In an embodiment, the processor includes an integrated circuit configured as an application processor (AP), a microprocessor in a personal computer (PC), a field-programmable gate array (FPGA) processor, and an Advanced RISC Machine (ARM) processor.

In an embodiment, the at least one display panel in the display apparatus includes a liquid crystal display panel having a backlight plate. The backlight plate includes a plurality of unit regions Each unit region is illuminated by the one or more light-emitting diodes as a backlight source for producing a luminance of the minimum region in the display panel.

In another embodiment, the at least one display panel includes a light-emitting diode display panel having a plurality of pixels. Each pixel contains the one or more light-emitting diodes for producing a luminance of the minimum region in the display panel.

Additionally, the display apparatus includes at least one camera or other detection device to trace an eyeball position of a viewer relative to the at least one display panel and transfer information about the eyeball position via internet protocol to the processor to determine local variables including a size of the sensitive area and coordinates of eyeball position of a viewer projected on the at least one display panel for selecting the multiple minimum regions of the sensitive ara and identifying the multiple combined-regions of the non-sensitive area. The processor in the display apparatus is further configured to analyze image data to be used for display a frame of image, perform scene recognition, deduce luminance values of the sensitive area and non-sensitive area corresponding to a current scene, refresh or update a current signal stored in a register of each of the plurality of the LED drivers to control the first luminance of a minimum region in the sensitive area and the second luminance of a combined-region in the non-sensitive area, perform high-performance rendering or anti-distortion processing to only part of the image data associated with the sensitive area and perform luminance reduction to remaining part of the image data associated with the non-sensitive area, and switch into a build-in-self-test mode or an initialization mode.

In yet another aspect, the present disclosure provides a head-mounted device (HID) comprising a display apparatus described herein configured for augmented reality (AR) or virtual reality (VR) application. The HMD is able to use the method described herein to optimize all static or video images displayed by the at least one display panel. In the display apparatus. Through gaze tracking to measure viewer s usage of the HMD, the relative eyeball position as well as a sensitive area can be dynamically determined to optimize image display as well as to compensate any structural error of the HMD, enhancing user's VR viewing experience.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for display optimization of a display apparatus comprising:

setting a light-emitting substrate including a first plurality of unit regions, each unit region being associated with a luminance produced by one or more light-emitting diodes;

determining a sensitive area having a second plurality of unit regions in part of the light-emitting substrate in association with eyeball position of viewer relative to the light-emitting substrate and a non-sensitive area having a plurality of combined-regions in remaining part of the light-emitting substrate, each combined-region containing k unit regions, wherein k is a combining factor greater than 1;

transferring local variables including information about the sensitive area and the combining factor k to a processor;

operating the processor based on the local variables to drive the one or more light-emitting diodes associated with one unit region to individually control a first luminance of the one unit region in the sensitive area and to drive k times of the one or more light-emitting diodes in one combined-region to commonly control a second luminance of k unit regions of the one combined-region in the non-sensitive area;

wherein operating the processor comprises:

analyzing image data to be displayed; determining a first driving current based on the image data; recording the first driving current in a register associated with a driver; and outputting the first driving current to drive the one or more light-emitting diodes associated with a unit region in the sensitive area to produce the first luminance for a current frame of image; and determining a second driving current based on the image data respectively for k unit regions in a combined-region; recording the second driving current in each of k registers respectively associated with k drivers; adjusting the second driving current outputted to commonly drive all light-emitting diodes associated with the combined-region to produce the second luminance for the current frame of image.

2. The method of claim 1, wherein setting the light-emitting substrate comprises arranging the first plurality of unit regions into m×n unit regions and determining a number of the one or more light-emitting diodes based on a dimension of the light-emitting substrate and a display resolution, wherein m is a row number >1 and n is a column number >1.

3. The method of claim 1, further comprising:

initializing memories of the processor regarding the local variables including size of the sensitive area, coordinates of eyeball position of a viewer projected on the light-emitting substrate for selecting the second plurality of unit regions of the sensitive area among the first plurality of unit regions in the light-emitting substrate, and the combining factor k; and initializing values stored in a register associated with a driver configured to drive the one or more light-emitting diodes associated with each unit region.

4. The method of claim 1, further comprising:

performing a handshake operation to establish data communication through internet between the processor and devices collecting the local variables.

5. The method of claim 4, further comprising keeping the processor idle if the handshake operation fails; and refreshing memories of the processor with the local variables received via internet from the devices collecting the local variables if the handshake operation succeeds.

6. The method of claim 1, wherein determining the first driving current comprises manipulating the image data to adjust the first driving current higher for enhancing a value of the first luminance for a unit region corresponding to a high brightness value of the image or reducing another value of the first luminance for another unit region corresponding to a low brightness value of the image.

7. The method of claim 6, wherein manipulating the image data comprises performing high-performance rendering or anti-distortion processing to part of the image data associated with the sensitive area.

8. The method of claim 1, wherein operating the processor further comprises performing a scene recognition operation on the current frame of image; refreshing the first driving current with a same value recorded in corresponding one register associated with the unit region in the sensitive area and refreshing the second driving current with an alternate same value recorded in k registers associated with the combined-region in the non-sensitive area if the scene recognition operation determines no scene change; updating the first driving current and the second driving current in respective registers if the scene recognition operation determines a scene change.

9. The method of claim 8, wherein operating the processor further comprises outputting the first driving current and the second driving current refreshed or updated in the respective registers to drive corresponding light-emitting diodes for producing an updated first luminance and an updated second luminance for a next frame of image.

10. The method of claim 1, wherein operating the processor further comprises determining whether an interruption signal is received by the processor, if true, enabling a built-in-self-test mode for the display apparatus for detecting whether any malfunction of the display apparatus exists; if false, performing a scene recognition operation on the current frame of image.

11. The method of claim 10, further comprising initializing memories of the processor if any malfunction of the display apparatus is detected; and refreshing the memories of the processor with the local variables if no malfunction of the display apparatus is detected.

12. A display apparatus comprising:
a driving IC and at least one display panel, the driving IC includes a processor and a plurality of LED drivers, each LED driver is configured to drive one or more light-emitting diodes for controlling a first luminance of a minimum region in the at least one display panel or a second luminance of 1/k of a combined-region comprising k minimum regions; the processor is configured to determine a sensitive area in part of the display panel containing multiple minimum regions and a non-sensitive area in remaining part of the display panel containing multiple combined-regions and to individually adjust the first luminance per minimum region and commonly adjust the second luminance of k minimum regions per combined-region; and
at least one camera to trace an eyeball position of a viewer relative to the at least one display panel and transfer information about the eyeball position via internet protocol to the processor to determine local variables including a size of the sensitive area and coordinates of eyeball position of a viewer projected on the at least one display panel for selecting the multiple minimum regions of the sensitive area and identifying the multiple combined-regions of the non-sensitive area;
wherein the processor is further configured to analyze image data to be used for displaying a frame of image, performing scene recognition, deducing luminance values of the sensitive area and non-sensitive area corresponding to a current scene, refreshing or updating a current signal stored in a register of each of the plurality of the LED drivers to control the first luminance of a minimum region in the sensitive area and the second luminance of a combined-region in the non-sensitive area, performing high-performance rendering or anti-distortion processing to only part of the image data associated with the sensitive area and perform luminance reduction to remaining part of the image data associated with the non-sensitive area, and switching into a build-in-self-test mode or an initialization mode.

13. The display apparatus of claim 12, wherein the processor comprises an integrated circuit configured as an application processor, a microprocessor in a personal computer, a field-programmable gate array (FPGA) processor, and an Advanced RISC Machine (ARM) processor.

14. The display apparatus of claim 12, wherein the at least one display panel comprises a liquid crystal display panel including a light-emitting substrate having a plurality of unit regions, each unit region being illuminated by the one or more light-emitting diodes as a backlight source for producing a luminance of the minimum region in the display panel.

15. The display apparatus of claim 12, wherein the at least one display panel comprises a light-emitting diode display panel including a plurality of pixels, each pixel containing the one or more light-emitting diodes for producing a luminance of the minimum region in the display panel.

16. A head-mounted device comprising a display apparatus of claim 12 configured for augmented reality or virtual reality application.

* * * * *